US011977841B2

(12) United States Patent
Geiman et al.

(10) Patent No.: US 11,977,841 B2
(45) Date of Patent: May 7, 2024

(54) CLASSIFICATION OF DOCUMENTS

(71) Applicant: Bank of America Corporation, Charlotte, NC (US)

(72) Inventors: Jeremy A. Geiman, New York, NY (US); Kongkuo Lu, Briarcliff Manor, NY (US); Ron Papka, Short Hills, NJ (US)

(73) Assignee: Bank of America Corporation, Charlotte, NC (US)

( * ) Notice: Subject to any disclaimer, the term of this patent is extended or adjusted under 35 U.S.C. 154(b) by 263 days.

(21) Appl. No.: 17/645,641

(22) Filed: Dec. 22, 2021

(65) Prior Publication Data

US 2023/0196017 A1    Jun. 22, 2023

(51) Int. Cl.
*G10L 15/00* (2013.01)
*G06F 40/279* (2020.01)
*G06F 40/30* (2020.01)
*G10L 21/00* (2013.01)

(52) U.S. Cl.
CPC ................... *G06F 40/279* (2020.01)

(58) Field of Classification Search
CPC .......... G10L 15/00; G10L 21/00; G06F 40/30
See application file for complete search history.

(56) References Cited

U.S. PATENT DOCUMENTS

| | | |
|---|---|---|
| 7,120,318 B2 | 10/2006 | Tyan et al. |
| 7,711,747 B2 | 5/2010 | Renders et al. |
| 8,041,139 B2 | 10/2011 | Ma |
| 8,239,335 B2 | 8/2012 | Schmidtler et al. |
| 8,374,977 B2 | 2/2013 | Schmidtler et al. |
| 8,462,394 B2 | 6/2013 | Fan et al. |
| 8,503,797 B2 | 8/2013 | Turkelson et al. |
| 8,520,941 B2 | 8/2013 | Nafarieh et al. |
| 8,540,158 B2 | 9/2013 | Lei et al. |

(Continued)

FOREIGN PATENT DOCUMENTS

| | | |
|---|---|---|
| CN | 102236696 A | 11/2011 |
| CN | 104636469 B | 1/2019 |

(Continued)

OTHER PUBLICATIONS

Vig, Jesse; URL:https://github.com/jessevig/bertviz [online], [retrieved on Feb. 7, 2024].

(Continued)

*Primary Examiner* — Shreyans A Patel (57) ABSTRACT

An apparatus includes a display device that displays an input document in a user interface and at least one processor configured to receive a command to determine a document type of the input document and classify the input document to assign at least one document type and a respective confidence score. The processor assigns a significance score to each word of the input document that is indicative of a degree of influence the word has in deciding that the input document is of the at least one document type. The processor determines a level of visual emphasis to be placed on each word of the input document based on the significance score of the word and displays the input document on the display device with each word of the input document visually emphasized in accordance with the determined level of visual emphasis of the word.

20 Claims, 6 Drawing Sheets

(56) References Cited

U.S. PATENT DOCUMENTS

| | | |
|---|---|---|
| 9,235,643 B2 | 1/2016 | Allawi et al. |
| 9,355,372 B2 | 5/2016 | Howald et al. |
| 9,483,740 B1 | 11/2016 | Ansel et al. |
| 9,547,712 B2 | 1/2017 | Kraley |
| 9,633,653 B1 | 4/2017 | Porter |
| 9,959,311 B2 | 5/2018 | Boguraev et al. |
| 10,019,437 B2 | 7/2018 | Ho et al. |
| 10,102,191 B2 | 10/2018 | Srinivasan et al. |
| 10,303,689 B2 | 5/2019 | Guggilla et al. |
| 10,354,472 B2 | 7/2019 | Kuklinski et al. |
| 10,387,511 B2 | 8/2019 | Evnine |
| 10,552,539 B2 | 2/2020 | Bachmann et al. |
| 10,565,502 B2 | 2/2020 | Scholtes |
| 10,810,494 B2 | 10/2020 | Shaji et al. |
| 10,884,979 B2 | 1/2021 | Paterson et al. |
| 10,943,105 B2 | 3/2021 | Chen et al. |
| 10,963,503 B2 | 3/2021 | Skiles et al. |
| 11,074,402 B1 | 7/2021 | Kumagai et al. |
| 11,288,453 B1 * | 3/2022 | Vinicombe ............ G06F 40/284 |
| 2008/0071536 A1 * | 3/2008 | Nagashima ............. G10L 15/32 |
| | | 704/E15.001 |
| 2008/0177541 A1 * | 7/2008 | Satomura ................ G10L 15/22 |
| | | 704/E15.044 |
| 2015/0120738 A1 | 4/2015 | Srinivasan |
| 2016/0085848 A1 | 3/2016 | Kogan et al. |
| 2016/0342578 A1 | 11/2016 | Mckinney et al. |
| 2017/0177180 A1 | 6/2017 | Bachmann et al. |
| 2017/0300535 A1 | 10/2017 | Papineni et al. |
| 2021/0141847 A1 | 5/2021 | Govind et al. |
| 2022/0318509 A1 * | 10/2022 | Dai ....................... G06F 40/295 |

FOREIGN PATENT DOCUMENTS

| | | | |
|---|---|---|---|
| CN | 109726400 A | * | 5/2019 |
| CN | 110888990 A | | 3/2020 |
| CN | 107787487 B | | 8/2021 |
| CN | 113537609 A | * | 10/2021 |
| CN | 108628971 B | | 11/2021 |
| EP | 1096391 A2 | | 5/2001 |
| EP | 2786272 A1 | | 10/2014 |
| EP | 2240878 B1 | | 10/2020 |
| JP | 3497172 B2 | | 2/2004 |
| JP | 2010039671 A | * | 2/2010 |
| JP | 6714024 B2 | | 6/2020 |
| KR | 101585029 B1 | | 1/2016 |
| KR | 1020160100322 A | | 8/2016 |
| WO | 2010103916 A1 | | 9/2010 |

OTHER PUBLICATIONS

Lertvittayakumjorn, Piyawat et al.; "Human-grounded Evaluations of Explanation Methods for Text Classification"; Proceedings of the 2019 Conference on Empirical Methods in Natural Language Processing and the 9th International Joint Conference on Natural Language Processing, pp. 5195-5205, Hong Kong, China, Nov. 3-7, 2019; URL:https://www.aclweb.org/anthology/D19-1523.pdf.

Montavon, Grégoire et al.; "Layer-Wise Relevance Propagation: An Overview"; Part of the Lecture Notes in Computer Science book series LNAI, vol. 11700, Springer, Cham (2019), URL:https://link.springer.com/chapter/10.1007/978-3-030-28954-6_10.

Bach et al. "Layer-wise Relevance Propagation" (LRP) technique. ("On Pixel-wise Explanations for Non-Linear Classifier Decisions by Layer-wise Relevance Propagation", ) URL:https://lrpserver.hhi.fraunhofer.de/text-classification, 2015.

Ribeiro, Marco Tulio et al.; "Why Should I Trust You?" Explaining the Predictions of any Classifier; URL:https://arxiv.org/pdf/1602.04938.pdf, Aug. 9, 2016.

* cited by examiner

FIG. 1

Document Text ╭─ 202

╭─ 112

RETAINER AGREEMENT  114

I. The Parties. This Retainer Agreement ("Agreement") is made effective as of November 21, 2021 by and between:

Service Provider: ABC company LLC with a street address of 123 Main Street, City of Safe Haven, State of Texas ("Service Provider")

AND

Client: Joe Boston with a street address of 456 Main Street, City of Safe Haven, State of Texas ("Client")

II. Services. Service Provider agrees to provide the following Services: Consulting and legal work related to the development of residential complex located at 222 Main Street, Safe Haven, Texas ("Services").

III. Term. The Services shall commence on January 1st, 2020, and end: (check one)
- ☐ - On the date of _________, 20____.
- ☒ - At completion of the Services performed.
- ☐ - Upon either party may terminate this Agreement with ____ days notice
- ☐ - Other. _________________________________

IV. Compensation In consideration for the Services provided, the Service Provider is to be paid in the following manner:
(check all that apply)
- ☒ - Per Hour. $100/hour
- ☐ - Per job. $______ for the completion of Services.
- ☐ - Commission. _____% commission based on ______
- ☐ - Other. _________________________________

V. Contingency As part of the Service Provider's Pay: (check one)
- ☒ - There SHALL be a contingency-fee arrangement in accordance with: (check applicable)

Classifications ╭─ 210

Agreement-60%
Amendment-20%
Note-10%
Letter-10%

╭─ 204

Classify

Document Text — 202
112

RETAINER AGREEMENT — 114

I. The Parties. This Retainer Agreement ("Agreement") is made effective as of November 21, 2021 by and between:

Service Provider: ABC company LLC with a street address of 123 Main Street, City of Safe Haven, State of Texas ("Service Provider")

AND

Client: Joe Boston with a street address of 456 Main Street, City of Safe Haven, State of Texas ("Client")

II. Services. Service Provider agrees to provide the following Services: Consulting and legal work related to the development of residential complex located at 222 Main Street, Safe Haven, Texas ("Services").

III. Term. The Services shall commence on January 1st, 2020, and end: (check one)
☐ - On the date of ________, 20___.
☒ - At completion of the Services performed.
☐ - Upon either party may terminate this Agreement with ___ days notice
☐ - Other. ________________________

IV. Compensation. In consideration for the Services provided, the Service Provider is to be paid in the following manner: (check all that apply)
☒ - Per Hour: $100/hour
☐ - Per job. $______ for the completion of Services.
☐ - Commission. ____% commission based on ______
☐ - Other. ________________________

V. Contingency. As part of the Service Provider's Pay: (check one)
☑ - There SHALL be a contingency fee arrangement in accordance with: (check applicable)

Classifications — 210
Agreement-60%

Classify — 204

⊠ Level-1
▨ Level-2
▩ Level-3
▨ Level-4

CLASSIFICATION OF DOCUMENTS

TECHNICAL FIELD

The present disclosure relates generally to data processing, and more specifically to automatic classification of documents.

BACKGROUND

Document classification or document categorization involves assigning one or more pre-defined classes or categories to a document based on the contents of the document. Classifying large volumes of documents is essential to make them more manageable and, ultimately, obtain valuable insights. Several commercially available document classification tools can automatically classify documents into predefined categories. Some of these tools use machine learning (ML) and Natural Language Processing (NLP) techniques to classify documents. However, the present tools fail to provide insight into why a document was classified into a particular category and which portions of the document had how much influence in deciding the category of the document.

SUMMARY

The system and methods implemented by the system as disclosed in the present disclosure provide an efficient method for automatically classifying an input document and visually emphasizing parts of the classified input document to indicate influence of particular portions of the document in classifying the document. The disclosed system and methods provide several practical applications and technical advantages.

For example, the disclosed system and methods provide the practical application of automatically classifying an input document to predict one or more document types and assigning a confidence score to each predicted document type indicating a probability of the input document being of the predicted document type. As described in accordance with one or more embodiments of the present disclosure, a document processor may use a classification model to classify an input document into one or more pre-defined document types. The classification of the input document may include automatically predicting that the input document is of one or more pre-defined document types based on analysis of the contents (e.g., text) of the input document. The document processor may be configured to pre-train the classification model to identify a plurality of pre-defined document types using a training dataset. The training dataset may include a number of known documents corresponding to each document type. Each document of the training dataset is a known example of a particular document type. Additionally, certain text (e.g., words, sentences, sub-sentences, paragraphs etc.) of each document from the training dataset may be pre-tagged to point to a particular document type. For each predicted document type, the classification model may provide a confidence score indicating how confident the classification model is that the input document is of the predicted document type. By automatically predicting a document type of the input document using a classification model pre-trained based on known and tagged documents of the document type, the disclosed system and methods provide the technical advantage of significantly increasing the accuracy of document classification thereby reducing errors in identifying a document type of the input document. Further, as more and more new documents are classified and assigned document types, the newly classified documents help a machine learning algorithm of the classification model to learn newer characteristics of particular document types which helps to continually increase the accuracy of document type predictions made by the classification model. For example, comparing documents with high and low confidence scores, along with the deterministic hints of influence discovered using the algorithm or user interaction as disclosed in this disclosure can be used to discover a strategy to improve accuracy of the document type prediction, such as enhancing training data, hyperparameter tuning etc. Thus, document classification described in accordance with embodiments of the present disclosure generally improves the technology related to document classification. In addition, improving accuracy of document classification provides the additional technical advantage of improving the processing efficiency of a computer processing the document classification. For example, pre-training the classification model based on known document types and further updating the training dataset with newly classified documents having high or low confidence scores may improve the speed with which the classification model can predict document types for candidate documents, thereby improving processing efficiency of the processor running the classification model. Further, accurately classified documents improve the functioning of a document management system designed to manage the documents, by avoiding or eliminating the need to re-classify incorrectly classified documents.

The disclosed system and methods provide an additional practical application of visually emphasizing (e.g., highlighting) portions of the classified input document based on how much influence the portions exercised in predicting that the input document is of a particular document type. As described in accordance with one or more embodiments of the present disclosure, the document processor may be configured to identify which portions of the input document exercised how much influence in classifying the input document in a particular document type. The identified portions of the document may include one or more paragraphs, one or more sentences, one or more sub-sentences and/or one or more words. As described in further detail below, in order to identify which portion of the document had how much influence in predicting a given document type, the document processor recursively splits the input document into a plurality of parts and independently classifies each part using the classification model to determine a confidence score of the part indicative of a probability of the part being of the given document type. The document processor assigns a significance score to each word of each part of the input document based on the determined confidence score of the part. The significance score of a word represents the degree of influence the word had in predicting that the input document is of a particular document type. The document processor assigns a level of visual emphasis to be placed on each word of the input document based on the significance score of the word. The document processor displays the input document on a display device with each word of the input document visually emphasized in accordance with the determined level of visual emphasis of the word from the influence map. By determining which portions of the input document had how much influence on the classification of the input document based on the above algorithm and visually emphasizing portions of the document based on their degree of influence on the classification operation improves the information provided regarding the classification. This information provides an insight into the underlying mechanism of the classification model and provides an effective tool to examine and/or evaluate the effectiveness of the classification model. Adjustments may be carried out to the classification algorithm and/or the training dataset used to train the classification model based on information extracted by the algorithm. This generally improves the technology related to automatic classification of documents.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
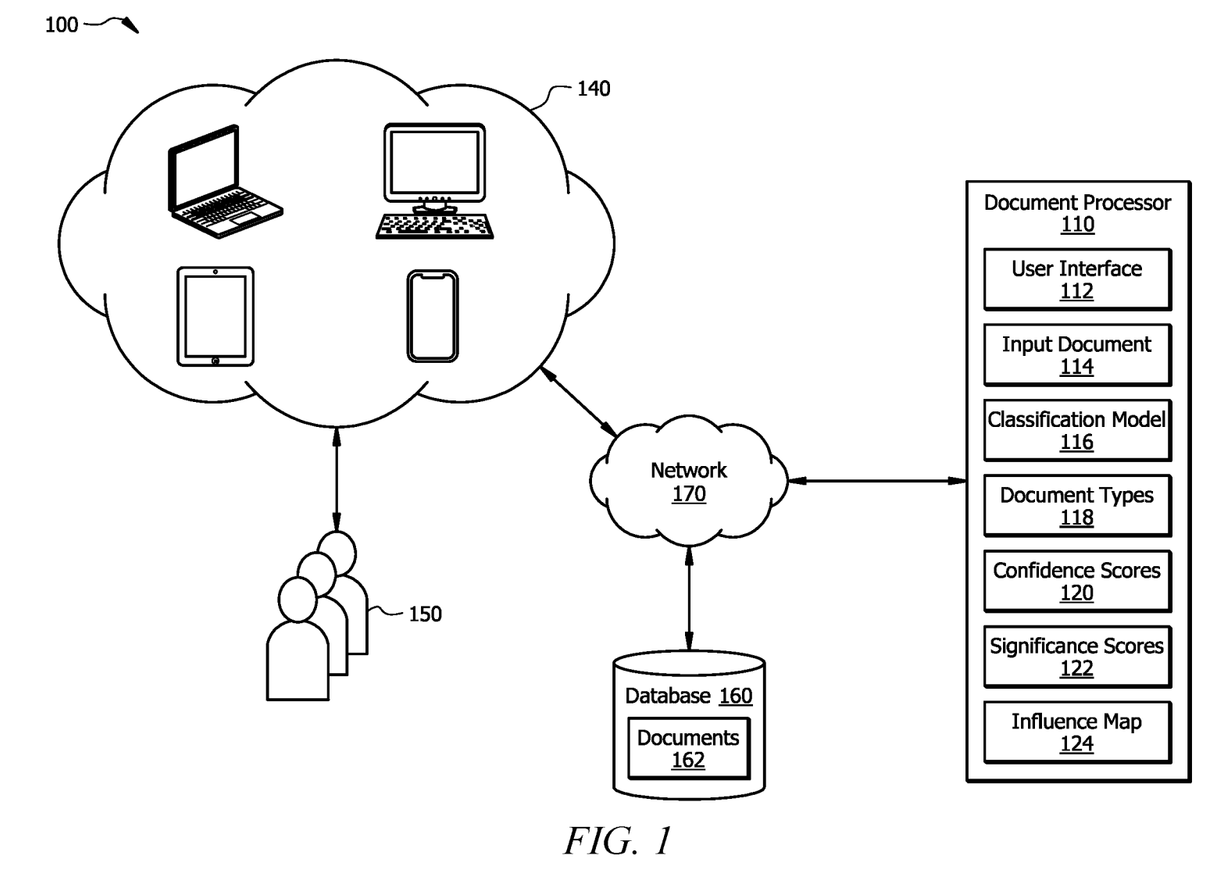
FIG. 1 is a schematic diagram of an example data processing system, in accordance with certain aspects of the present disclosure.

FIG. 1 is a schematic diagram of an example data processing system 100, in accordance with certain aspects of the present disclosure.

As shown in FIG. 1, data processing system 100 may include a document processor 110, one or more user devices 140 and a database 160, each connected to a network 170. The network 170, in general, may be a wide area network (WAN), a personal area network (PAN), a cellular network, or any other technology that allows devices to communicate electronically with other devices. In one or more embodiments, the network 170 may be the Internet. Each user device 140 may be operated by one or more users 150. Each user device 140 may be a computing device that can be operated by a user 150 and communicate with other devices connected to the network 170.

In one or more embodiments, each of the document processor 110, user devices 140 and the database 160 may be implemented by a computing device running one or more software applications. For example, one or more of the document processor 110, user devices 140 and database 160 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the document processor 110, user devices 140 and database 160 may be representative of a server running one or more software applications to implement respective functionality as described below. In certain embodiments, one or more of the document processor 110, user devices 140 and database 160 may run a thin client software application where the processing is directed by the thin client but largely performed by a central entity such as a server (not shown).

In one embodiment, the document processor may be a standalone computing device (e.g., desktop computer, laptop computer, mobile computing device etc.) directly connected to or including a display device (e.g., a desktop monitor, laptop screen, smartphone screen etc.) and a user interface device (e.g., keyboard, computer mouse, touchpad etc.) allowing a user 150 to interact with the computing device. In an additional or alternative embodiment, one or more of the user devices 140 may run a thin client software application where the processing is directed by the thin client but largely performed by the document processor 110.

Document processor 110 may cause a user interface 112 to be displayed on a display device (e.g., a display device of a user device 140 or a display device directly connected to the document processor 110). The user interface 112 may allow a user 150 to perform one or more operations related to classification of an input document 114 using a user interface device (e.g., keyboard, computer mouse, touch pad etc.). For example, the user interface 112 may provide an input field that can display an input document 114 the user desires to be classified. Database 160 may store a plurality of documents 162 accessible to the user devices 140 and the document processor 110, wherein one or more documents 162 may be unclassified. In one embodiment, a user device 140 may locally store a plurality of documents 162 of which one or more documents 162 may be unclassified. The user interface may allow the user 150 to select one of the documents 162 as the input document 114 for classification. The selected input document 114 can be displayed on the display device in a designated input field of the user interface 112. As noted above, document classification includes assigning one or more pre-defined classes or categories or document types to a document based on the contents of the document. The term "classified document" may refer to a document 162 that has been assigned a document category or type. The term "unclassified document" may refer to a document 162 has not yet been assigned a document category or type.

Document processor 110 may be configured to use a classification model 116 to classify an input document 114 into one or more pre-defined document types (or document categories) 118. The classification model 116 may be capable of classifying an input document 114 into one or more pre-defined document types 118. For example, the classification model 116 may use machine learning (ML) and Natural Language Processing (NLP) algorithms to classify the input document 114 into one or more pre-defined document types 118. The classification of the input document 114 may include automatically predicting that the input document 114 is of one or more pre-defined document types 118, based on analysis of the contents (e.g., text) of the input document 114. The document processor 110 may be configured to pre-train the classification model 116 to identify a plurality of pre-defined document types 118 using a training dataset. The training dataset may include a number of known documents corresponding to each document type 118. Each document of the training dataset is a known example of a particular document type 118. In an embodiment, certain text (e.g., words, sentences, sub-sentences, paragraphs etc.) of each document from the training dataset is pre-tagged to point to a particular document type 118. The text tagging allows the classification model 116 to identify portions of text from an input document 114 as belonging to a certain document type 118. Once the classification model 116 is trained based on enough known examples of a document type 118 having pre-tagged text, the classification model 116 can reliably predict that an input document 114 is of the document type 118. A higher number of pre-tagged training documents of a certain document type 118 generally leads to a more accurate prediction corresponding to the document type 118.

It may be noted that the classification model 116 may be re-trained based on a different training dataset to identify a different set of document types 118, identify an additional document type 118 or drop an already trained document type 118.

A user 150 may trigger a classification of an input document 114 from the user interface 112. For example, a user may select the input document 114 or a portion thereof from the documents 162 for classification. The selected input document 114 or the selected portion thereof can be displayed in a designated input field of the user interface 112. Once the desired input document is selected, the user 150 may launch the classification operation from the user interface 112 (e.g., by selecting a designated button provided on the user interface 112). Once the document classification is launched, the document processor 110 may use the pre-trained classification model 116 to classify the input document 114 into one or more pre-defined document types 118 the classification model 116 is trained to identify. For example, the classification model 116 may analyze the text of the input document 114 and assign one or more pre-defined documents types 118 to the input document 114. For each predicted document type 118, the classification model 116 may provide a confidence score 120 indicating how confident the classification model 116 is that the input document 114 is of the predicted document type 118. In one embodiment, the confidence score 120 is in the form of a numerical probability percentage indicative of the probability of the input document 114 is of a particular document type 118.

Figure 2A:
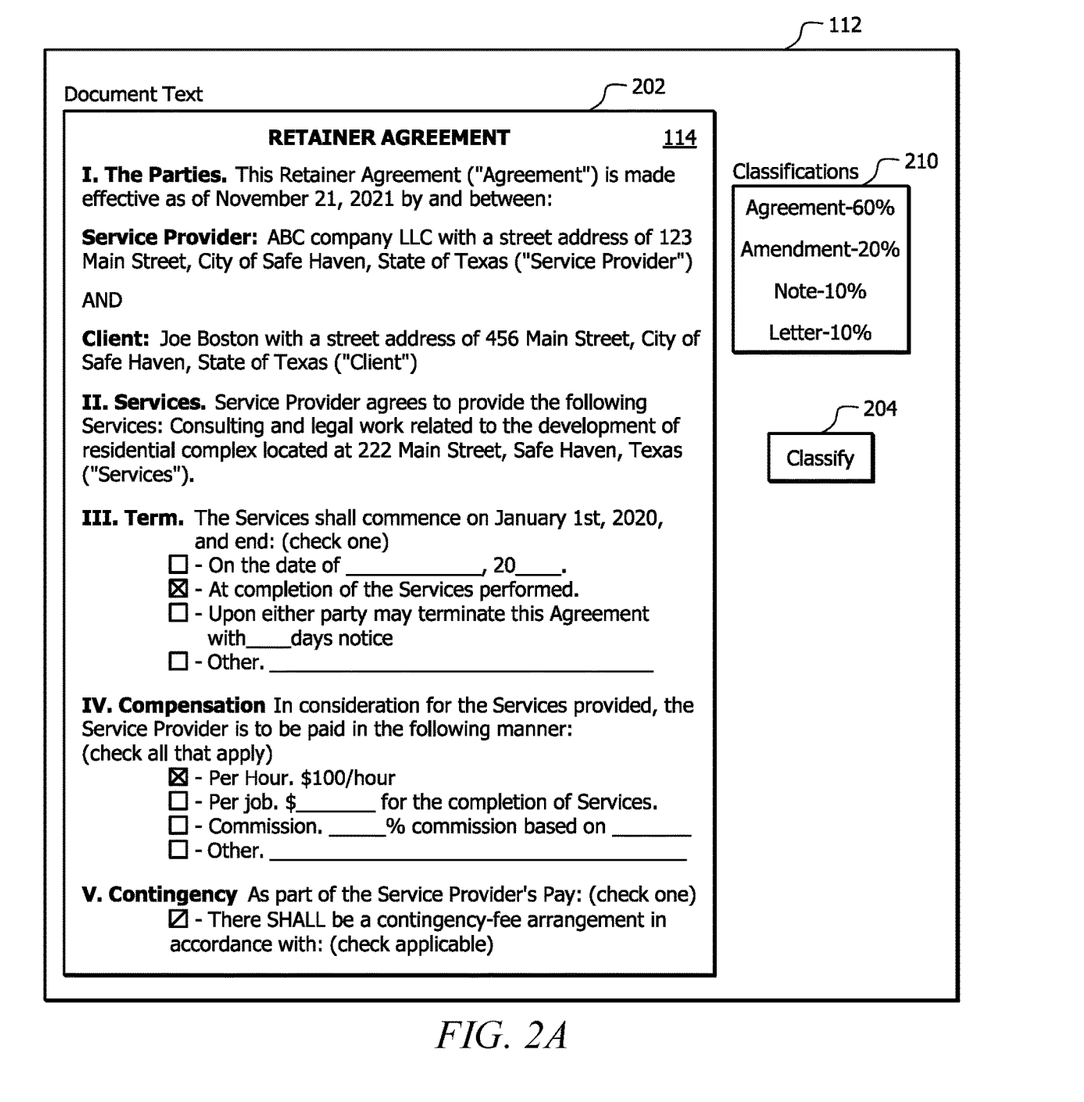
FIG. 2A illustrates an example user interface used for automatic classification of documents, in accordance with one or more embodiments of the present disclosure.

FIG. 2A illustrates an example user interface (e.g., user interface 112) used for automatic classification of documents (e.g., input document 114), in accordance with one or more embodiments of the present disclosure.

As shown in FIG. 2A, user interface (UI) 112 includes an input field 202 that displays an example input document 114 currently selected for classification. As described above, the UI 112 may provide a mechanism to a user 150 to select the input document 114 from the documents 162 stored in the database 160 or locally at the user device 140 being used by the user 150. Once the input document 114 is selected and displayed in the input field 202, the user 150 may launch classification of the input document 114 by clicking the classify button 204 provided by the UI 112. A person having ordinary skill in the art may appreciate that other known mechanisms may be used to launch the classification operation. Once the classification operation is launched, the document processor 110 uses the classification model 116 to classify the input document 114 into one or more pre-defined document types 118 that the classification model 116 is pre-trained to identify. As shown in FIG. 2A, upon successful completion of the classification operation by the classification model 116, the document processor 110 displays the results of the classification in a results box 210 of the UI 112. The results of the classification operation displayed in the results box 210 may include one or more predicted document types 118 and respective confidence scores 120. For example, as shown in FIG. 2A, the result box 210 shows that the classification model 116 has assigned four different document types 118 to the input document 114 including "Agreement", "Amendment", "Note" and "Letter". The result box 210 further displays a confidence score against each predicted document type 118. As shown, "Agreement" has a confidence score of 60% indicating that there is 60% probability that the input document is an "Agreement". "Amendment" has a confidence score of 20% indicating that there is 20% probability that the input document is an "Amendment". "Note" has a confidence score of 10% indicating that there is 10% probability that the input document is a "Note". "Letter" has a confidence score of 10% indicating that there is 10% probability that the input document is a "Letter".

Document processor 110 may be configured to identify which portions of the input document 114 exercised how much influence in classifying the input document 114 in a particular document type 118. For example, referring FIG. 2A, the document processor 110 may identify which portions of the input document 114 had how much influence in predicting that the input document 114 is an "Agreement". The identified portions of the document may include one or more paragraphs, one or more sentences, one or more sub-sentences and/or one or more words. As described in further detail below, in order to identify which portion of the document had how much influence in predicting a given document type 118, the document processor 110 recursively splits the input document into a plurality of parts and independently classifies each part using the classification model to determine a confidence score of the part indicative of a probability of the part being of the given document type. The document processor 110 assigns a significance score 122 to each word of each part of the input document 114 based on the determined confidence score of the part. The significance score 122 of a word represents the degree of influence the word had in predicting that the input document 114 is of a particular document type 118. In one embodiment, the significance score is a numerical weight.

The algorithm used by the document processor 110 to determine the significance score of each word in the input document 114 will now be described in detail. Once the input document 114 has been classified and one or more document types 118 and respective confidence scores 120 have been assigned, the document processor 110 may be configured to receive a selection of one of the assigned document types 118. The document processor 110 may be configured to determine which portions of the input document 114 had how much influence in deciding that the input document 114 is of the selected document type 118. Receiving the selection of the document type 118 may include the document processor 110 automatically selecting one of the predicted document types based on a pre-configured rule or the user 150 manually selecting a document type 118 from the predicted document types 118. For example, referring to FIG. 2A, the user 150 may manually select the document type "Agreement" for determining which portions of the input document had how much influence in deciding that the input document 114 is an "Agreement". In one embodiment, the document processor 110 may automatically select the predicted document type 118 having the highest confidence score 120.

The algorithm for determining the significance scores of words in the input document 114 begins with initializing the significance scores of all the words of the input document to zero. The text of the input document 114 is then divided into two parts (e.g., two equal or substantially equal parts). The document processor 110 independently classifies each of the two parts using the classification model 116 and determines the confidence score 120 of each part, wherein the confidence score 120 of each part comprises a numerical percentage indicating a probability of the part being of the selected document type. For example, referring FIG. 2A, when the selected document type is "Agreement", the confidence score 120 of each divided part includes a numerical percentage indicated a probability of the part being an "Agreement". Once the confidence scores 120 of the two parts are determined, the document processor 110 subtracts the confidence score of the part having a lower numerical percentage from the confidence score of the part having a higher numerical percentage. The difference in the confidence scores of the two parts is divided by two to yield an adjustment factor. The document processor 110 adds the adjustment factor to the weights of each word of the part having the higher numerical percentage. The document processor 110 subtracts the adjustment factor from the weights of each word of the other part having the lower numerical percentage. The document processor 110 may be configured to recursively split the input document 114 a plurality of times. After each split, the document processor 110 may be configured to repeat the above described steps including independently classifying the parts resulting from the split, determining the difference in confidence scores, calculating the adjustment factor and adjusting the numerical weights of each word of the two parts by adding or subtracting the adjustment factor from the weights of the words as described above.

The document processor 110 may be configured to recursively split the input document 114 and adjust the numerical weights of the words in the input document 114 until a predetermined threshold is met or when the latest document split lead to a word level split (e.g., each of the two parts includes a single word). The threshold may include a predetermined time interval starting from receiving the command, wherein the document processor 110 continues splitting the input document 114 until the time interval expires. In one example, the threshold time interval is set to 10 seconds.

Figure 2B:
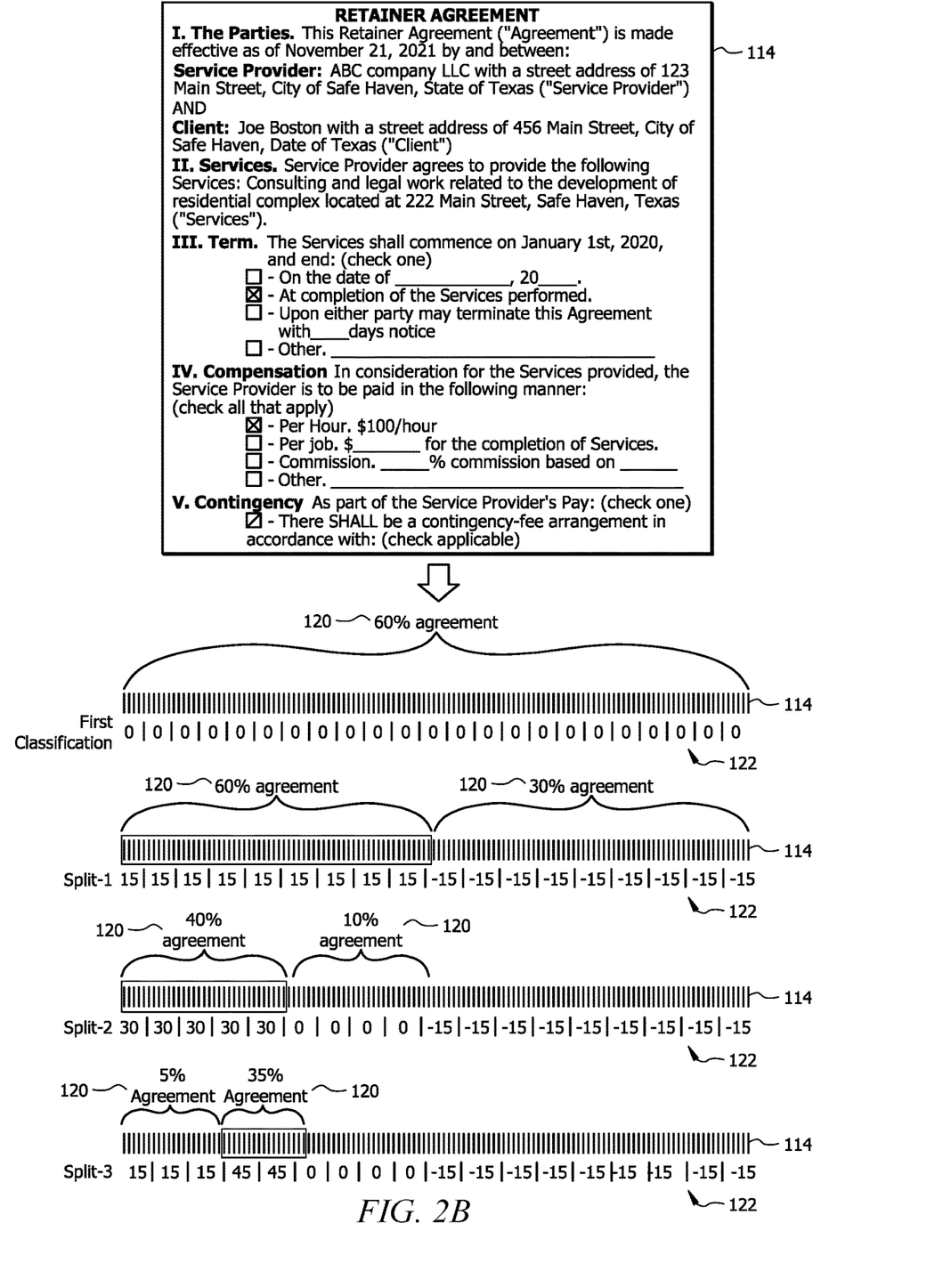
FIG. 2B illustrates an example algorithm for determining significance scores of the words in the example input document shown in FIG. 2A, in accordance with one or more embodiments of the present disclosure.

FIG. 2B illustrates an example algorithm 200 for determining significance scores of the words in the example input document (e.g., input document 114) shown in FIG. 2A, in accordance with one or more embodiments of the present disclosure.

As shown in FIG. 2B, the input document 114 is recursively split three times (shown as split 1 to split 3). The short vertical lines extending from left to right represent the entire text of the input document 114. Each number shown right below the vertical lines represents a significance score 122 of a single word in the form of a numerical weight. It may be noted that the number of words of the input document 114 shown in FIG. 2B are for exemplary purposes only, and that a person of ordinary skill in the art can appreciate that the algorithm 200 as described in this disclosure equally applies to an input document 114 having fewer or more words.

As shown in FIG. 2B, after the initial classification step (e.g., performed upon launching the classification of the input document 114 as described above) is completed, the classification model 116 predicts a 60% probability of the input document being an "Agreement" (as also shown in FIG. 2A). As shown, each word of the input document 114 is initialized to a significance score of zero. In a first split (shown as Split 1) of the input document, the entire text of the input document 114 is split into two parts (e.g., equal parts), and each of the two parts is classified using the classification model 116 to determine a confidence score of the part that indicates a probability of the part being an "Agreement". The confidence score 120 of the first part is determined as 60% indicating that there is a 60% probability that the first part is an "Agreement". On the other hand, the confidence score 120 of the second part is determined as 30% indicating that there is a 30% probability that the second part is an "Agreement". This means that words in the first part have a higher influence as compared to words of the second part in predicting that the input document 114 is an "Agreement". The lower confidence score of 30 is subtracted from the higher confidence score of 60, yielding a difference of 30. This difference is divided by two (30/2) yielding an adjustment factor of 15. The adjustment factor of 15 is added to the weights of each word in part 1 (having the higher confidence score) and subtracted from the weights of each word in part 2. Thus, after the split 1 is processed, each word in part 1 has a significance score of +15 and each word in part 2 has a significance score of −15.

In a second split (shown as Split 2), the first part of the input document 114 from split 1 having the higher confidence score of 60% is further split into two parts. Each of the two parts is classified yielding a 40% confidence score for the first part and a 10% score for the second part. This means that words in the first part have a higher influence than words of other parts in predicting that the input document 114 is an "Agreement". ((40−10)/2) yields an adjustment factor of 15. The adjustment factor of 15 is added to the weights of each word in part 1 (having the higher confidence score) and subtracted from the weights of each word in part 2. Thus, after the split 2 is processed, each word in part 1 has a significance score of (15+15=30), while each word in part 2 has a significance score of (15−15=0). It may be noted that the significance scores 122 of the words from the second part of split 1 remain the same.

In a third split (shown as Split 3), the first part of the input document 114 from split 2 having the higher confidence score of 40% is further split into two parts. Each of the two parts is classified yielding a 5% confidence score for the first part and a 35% score for the second part. This means that words in the second part have a higher influence than words of other parts in predicting that the input document 114 is an "Agreement". ((35−5)/2) yields an adjustment factor of 15. The adjustment factor of 15 is added to the weights of each word in part 2 (having the higher confidence score) and subtracted from the weights of each word in part 1. Thus, after the split 3 is processed, each word in part 1 has a significance score of (30−15=15), while each word in part 2 has a significance score of (30+15=45). It may be noted that the significance scores 122 of the words from the second part of split 2 remain the same.

In the example algorithm 200 of FIG. 2B, a predetermined time threshold expires after or during the third split, causing the document processor 110 to stop further recursive splits of the input document 114.

It may be noted that, for ease of illustration, FIG. 2B illustrates a single example recursion of the algorithm showing one of the two parts being split at each of the split stages 1, 2 and 3 until the threshold is satisfied. In one or more embodiments, at each split stage (e.g., splits 1, 2 and 3), the algorithm may split each part of the input document 114 from a previous split and adjust the weights of the words in each part as described above. The recursive splitting of the parts may continue until the predetermine threshold is satisfied.

Once the document processor 110 stops recursively splitting the input document 114 (e.g., upon expiration of the time threshold or upon reaching a word level split), the significance scores 122 finally assigned to the words of the input document 114 may be referred to as an influence map 124, wherein the significance score 122 of each word is indicative of a degree of influence the word has in predicting that the input document 114 is an "Agreement". The document processor 110 may locally store the influence map 124 having the final significance scores of each word of the input document 114.

It may be appreciated that a higher number of recursive splits will generally yield a more accurate influence map 124 having a higher focus on words that influenced the document type prediction by classification model 116. A more focused influence map provides a better idea of which portions of the input document had how much influence in predicting the document type. Thus, in an embodiment, the time interval threshold may be set based on the length of an input document to allow enough number of splits to yield a sufficiently focused influence map 124.

The document processor 110 may be configured to assign a level of visual emphasis to be placed on each word of the input document 114 based on how much influence the word exercised on the input document 114 being assigned a particular document type 118, wherein the influence of the word is a direct function of the significance score 122 of the word. For example, a level of visual emphasis assigned to a word of the input document 114 is directly proportional to the significance score 122 of the word, wherein a higher level of visual emphasis is assigned to a word having a higher significance score 122. In other words, a higher level of visual emphasis is assigned to a word determined to have a higher influence over the classification. A word may be visually emphasized in a number of ways. In one embodiment, the visual emphasizing a word may include highlighting a word in a predetermined color. In this case, an opacity of highlighting a word may be decided based on the significance score 122 of the word, wherein a higher level of opacity for the highlighting (darker highlighting) is assigned to a word having a higher significance score 122. Accordingly, words having a higher significance score 122 are highlighted in a darker shade as compared to words having a lower significance score 122. For example, the significance scores 122 or weights may range from 0-100, wherein each significance score corresponds to a slightly different opacity of highlighting with a significance score of 0 corresponding to the lowest opacity of highlighting (lightest highlighting, for example, no highlighting) and a significance score of 100 corresponding to the highest opacity of highlighting (darkest highlighting).

The document processor 110 may be configured to display the input document 114 on the display device (e.g., display of a user device 140 being operated by the user 150) with each word of the input document 114 visually emphasized (e.g., highlighted) in accordance with the determined level of visual emphasis of the word. For example, when the visual emphasis includes highlighting words, this results in portions of the input document 114 (e.g., words, sentences etc.) being shown highlighted in different shades of the color, wherein high influence words (e.g., having higher significance score 122) are shown highlighted in a darker shade.

Figure 2C:
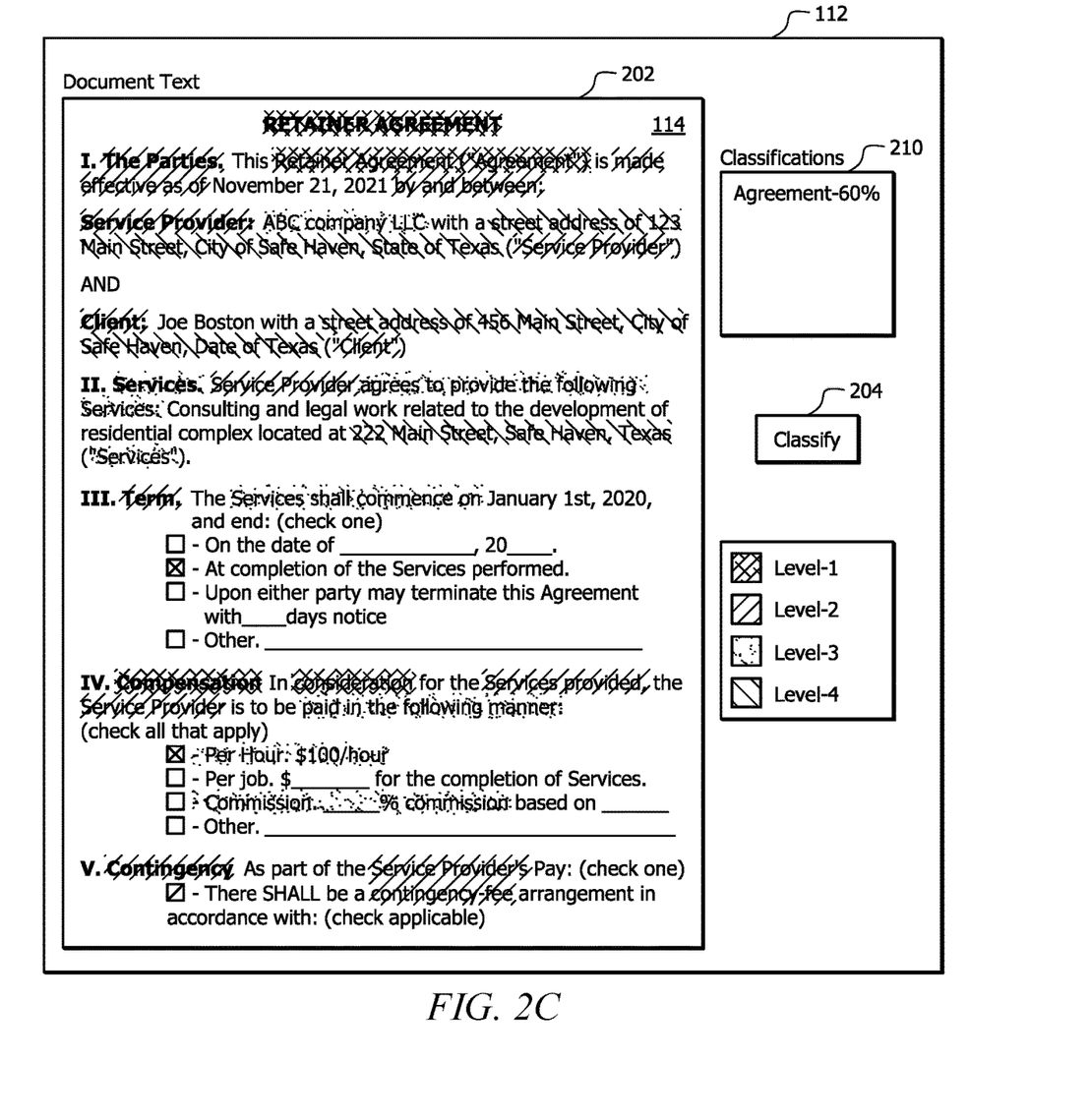
FIG. 2C illustrates the example input document of FIG. 2A highlighted according to the significance scores of the words in the input document, in accordance with one or more embodiments of the present disclosure.

FIG. 2C illustrates the example input document of FIG. 2A highlighted according to the significance scores of the words in the input document, in accordance with one or more embodiments of the present disclosure.

As shown, words in the input document 114 are highlighted in four different types of hatching (shown as level-1 to level-4 hatching), wherein each of the four types of hatching represents a different level of visual emphasis. In FIG. 2C, level-1 to level-4 hatching are representative of increasing levels of visual emphasis, wherein level-1 hatching represents the highest level of visual emphasis corresponding to words having the highest significance scores 122 and level-4 hatching represents the lowest level of visual emphasis corresponding to words having the lowest significance scores 122.

It may be noted that any other method of visually emphasizing the text of a document may be used instead of or in combination with word highlighting as described above. Other methods of visually emphasizing words of the input document 114 may include, but are not limited to, using different text coloring to represent different levels of visual emphasis, using various thicknesses of bold text to represent the different levels, using underlined and non-underlined text to represent the different levels, using text in different fonts to represent the different levels and using highlighting in various colors to represent the different levels.

The visually emphasized text as described above allows a user to easily identify portions (e.g., words, sentences, sub-sentences, paragraphs etc.) of the input document 114 which influenced prediction by the classification model 116 of a particular document type 118. Further, the different levels of visual emphasis (e.g., different opacities of highlighting) placed on words based on their significance scores 122 further allows the user to identify, based on a quick visual inspection, which portions of the input document 114 had how much influence in the prediction. Knowing how certain text in the input document 114 influenced the prediction of a particular document type may allow the user to include certain words when drafting similar documents to increase accuracy of prediction of the document type. Additionally or alternatively, the user may also avoid using certain words that influenced prediction that the input document 114 is of an undesired document type. Thus, the systems and methods disclosed herein may help improve the accuracy of predicting document types of input documents.

In one or more embodiments, the document processor 110 may be configured to update the training of the classification model 116 based on newly classified input documents 114. For example, the document processor 110 may be configured to dynamically detect additional characteristics of certain document types based on input documents 114 recently predicted as being of those certain document types. In one embodiment, the document processor 110 may be configured to add to the training dataset recently classified input documents 114 in one or more document types 118 having a threshold confidence score and retrain the classification model 116 based on the updated training dataset. The document processor 110 may continually add newly classified input documents 114 to the training dataset as input documents 114 are classified and re-train the classification model 116 in real-time. Thus, the document processor 110 may iteratively improve the classification accuracy of the classification model over time.

In one or more embodiments, once an input document 114 has been classified, a user 150 may edit the input document 114 in the user interface 112 to improve the accuracy of classification in a particular document type 118. For example, when the user 150 desires to improve the confidence score 120 of a prediction in a particular document type 118, the user may remove portions of the input document 114 that negatively influenced the prediction of the document type 118. The portions of the input document 114 that negatively influenced the prediction may include text that is highlighted in a lighter shade or text that is highlighted in a darker shade with reference to a prediction of an undesired document type 118. The user 150 may rerun the classification after carrying out the edits to the input document 114. The document processor 110 may be configured to monitor the changes made to the input document and resulting change in confidence scores 120 when the revised input document 114 is re-classified. Data collected from such monitoring may be used to update the training of the classification model 116 for improving the accuracy of subsequent document classifications.

Figure 3:
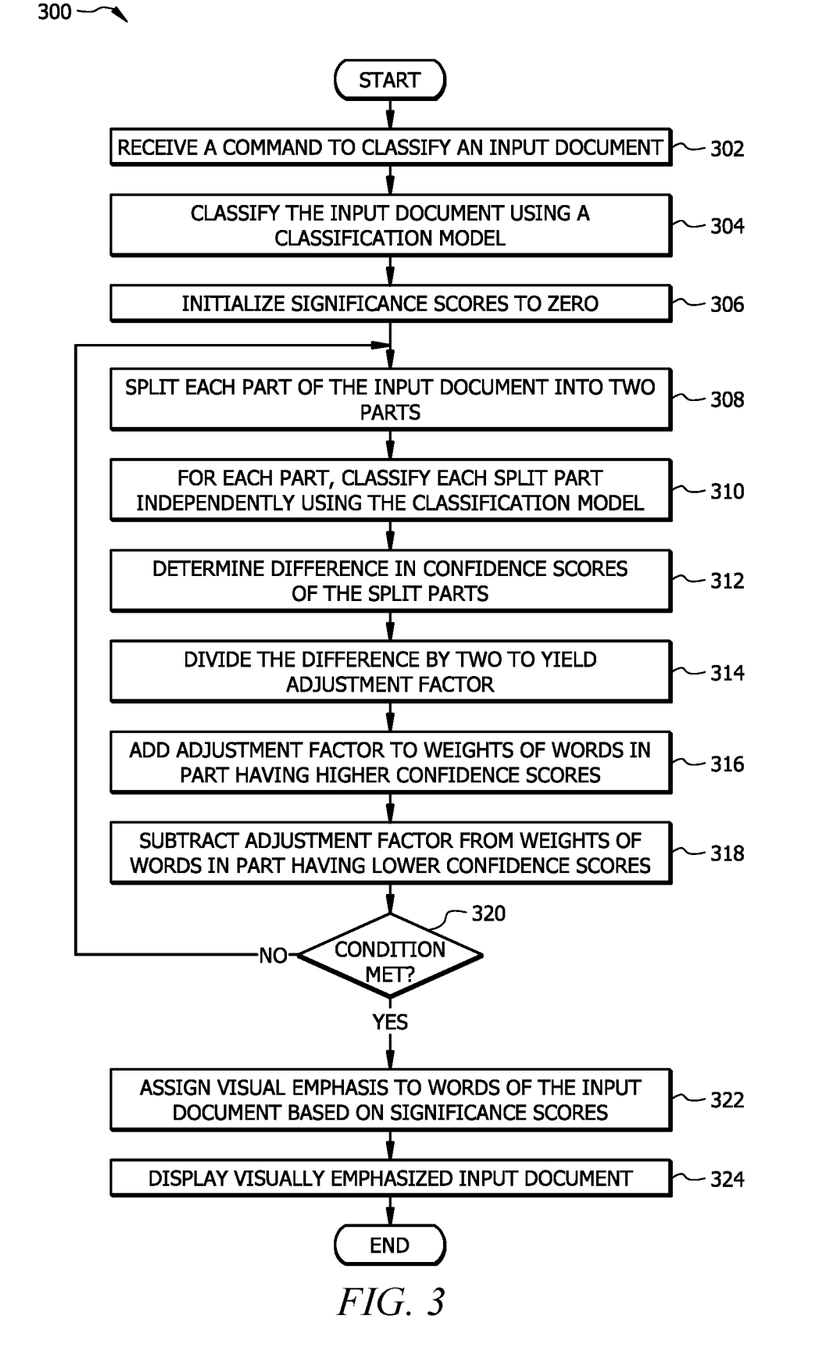
FIG. 3 is a flowchart of an example method for providing a user access to a network resource, in accordance with certain embodiments of the present disclosure.

FIG. 3 is a flowchart of an example method 300 for classifying an input document (e.g., input document 114), in accordance with one or more embodiments of the present disclosure. Method 300 may be performed by the document processor 110 as shown in FIG. 1 and described above.

At operation 302, the document processor 110 receives a command to determine a document type 118 of an input document 114. As described above, a user 150 may trigger a classification of an input document 114 from the user interface 112. For example, a user may select the input document 114 or a portion thereof from the documents 162 for classification. The selected input document 114 or the selected portion thereof can be displayed in a designated input field of the user interface 112. Once the desired input document is selected, the user 150 may launch the classification operation from the user interface 112 (e.g., by selecting a designated button provided by the user interface 112). In an embodiment, launching the classification operation generates the command for the document processor 110 to initiate classification of the input document 114. As shown in FIG. 2A, UI 112 includes an input field 202 that displays an example input document 114 currently selected for classification. The UI 112 may provide a mechanism to a user 150 to select the input document 114 from the documents 162 stored in the database 160 or locally at the user device 140 being used by the user 150. Once the input document 114 is selected and displayed in the input field 202, the user 150 may launch classification of the input document 114 by clicking the classify button 204 provided by the UI 112.

At operation 304, in response to receiving the command, the document processor 110 classifies the input document 114 using a classification model 116, wherein the classification model 116 predicts that the input document is of at least one document type 118 of the plurality of document types 118 along with a corresponding confidence score 120, wherein the confidence score 120 is indicative of a probability of the input document 114 being of the at least one document type 118.

As described above, once the document classification is launched, the document processor 110 may use the pre-trained classification model 116 to classify the input document 114 into one or more pre-defined document types 118 the classification model 116 is trained to identify. For example, the classification model 116 may analyze the text of the input document 114 and assign one or more pre-defined documents types 118 to the input document 114. For each predicted document type 118, the classification model 116 may provide a confidence score 120 indicating how confident the classification model 116 is that the input document 114 is of the predicted document type 118. In one embodiment, the confidence score 120 is in the form of a numerical probability percentage indicative of the probability of the input document 114 is of a particular document type 118. As shown in FIG. 2A, upon successful completion of a classification operation by the classification model 116, the document processor 110 displays the results of the classification in a results box 210 of the UI 112. The results of the classification operation displayed in the results box 210 may include one or more predicted document types 118 and respective confidence scores 120.

At operation 306, the document processor 110 initializes the significance scores 122 of each word of the input document 114 to '0'.

As described above, document processor 110 may be configured to identify which portions of the input document 114 exercised how much influence in classifying the input document 114 in a particular document type 118. For example, referring FIG. 2A, the document processor 110 may identify which portions of the input document 114 had how much influence in predicting that the input document 114 is an "Agreement". The identified portions of the document may include one or more paragraphs, one or more sentences, one or more sub-sentences and/or one or more words. As described in further detail below, in order to identify which portion of the document had how much influence in predicting a given document type 118, the document processor 110 recursively splits the input document 114 into a plurality of parts and independently classifies each part using the classification model to determine a confidence score 120 of the part indicative of a probability of the part being of the given document type. The document processor 110 assigns a significance score 122 to each word of each part of the input document 114 based on the determined confidence score of the part. The significance score 122 of a word represents the degree of influence the word had in predicting that the input document 114 is of a particular document type 118. In one embodiment, the significance score is a numerical weight. The algorithm for determining the significance scores of words in the input document 114 begins with initializing the significance scores of all the words of the input document to zero.

At operation 306, the document processor 110 splits each part of the input document 114 into two further parts. When splitting the input document 114 for the first time after the initial classification in operation 304 the entire text of the input document 114 is split into two parts.

As described above, once the input document 114 has been initially classified (e.g., in operation 304) and one or more document types 118 and respective confidence scores 120 have been assigned, the document processor 110 may be configured to receive a selection of one of the assigned document types 118. The document processor 110 may be configured to determine which portions of the input document 114 had how much influence in deciding that the input document 114 is of the selected document type 118. Receiving the selection of the document type 118 may include the document processor 110 automatically selecting one of the predicted document types based on a pre-configured rule or the user 150 manually selecting a document type 118 from the predicted document types 118. For example, referring to FIG. 2A, the user 150 may manually select the document type "Agreement" for determining which portions of the input document had how much influence in deciding that the input document 114 is an "Agreement". In one embodiment, the document processor 110 may automatically select the predicted document type 118 having the highest confidence score 120. In a first split of the input document 114, the text of the input document 114 is divided into two parts (e.g., two equal or substantially equal parts).

At operation 310, for each part of the input document 114, the document processor 110 independently classifies each of the two split parts using the classification model 116 and determines the confidence score 120 of each split part, wherein the confidence score 120 of each split part comprises a numerical percentage indicating a probability of the part being of the selected document type. For example, referring FIG. 2A, when the selected document type is "Agreement", the confidence score 120 of each split part includes a numerical percentage indicated a probability of the part being an "Agreement".

At operation 312, the document processor 110 determines the difference between the confidence scores 120 of the two split parts. For example, once the confidence scores 120 of the two split parts are determined, the document processor 110 subtracts the confidence score of the part having a lower numerical percentage from the confidence score of the part having a higher numerical percentage.

At operation 314, the document processor 110 divides the difference in the confidence scores 120 of the two split parts by two to yield an adjustment factor.

At operation 316, the document processor 110 adds the adjustment factor to the weights of each word of the split part having the higher confidence score/numerical percentage.

At operation 318, the document processor 110 subtracts the adjustment factor from the weights of each word of the other split part having the lower confidence score/numerical percentage.

At operation 320, the document processor 110 checks whether a condition is satisfied. As described above, the document processor 110 may recursively split the input document 114 a plurality of times, wherein each subsequent time the document processor 110 splits each part into two further parts. After each split of a part, the document processor 110 may be configured to repeat the above described steps including independently classifying the split parts of the part, determining the difference in confidence scores, calculating the adjustment factor and adjusting the numerical weights of each word of the two split parts by adding or subtracting the adjustment factor from the weights of the words as described above. The document processor 110 may be configured to recursively split the input document 114 and adjust the numerical weights of the words in the input document 114 until a condition is satisfied. The condition may include predetermined threshold being met or when the latest document split lead to a word level split (e.g., each of the two parts includes a single word). The threshold may include a predetermined time interval starting from receiving the command, wherein the document processor 110 continues splitting the input document 114 until the time interval expires. In one example, the threshold time interval is set to 10 seconds.

When the document processor 110 determines that the condition is not satisfied at operation 320, the method 300 loops back to operation 308 where each part of the input document 114 from the previous split is further split into two more parts and operations 310 to 318 are performed again for the two split parts of each part from the previous split.

When the document processor 110 determines that the condition is met (e.g., threshold time interval expires or a word level split is reached), method 300 proceeds to operation 322 where the document processor 110 determines and assigns a level of visual emphasis to be placed on each word of the input document 114 based on the significance score 122 of the word, wherein a word having a higher significance score 122 is assigned a higher level of visual emphasis.

As described above, once the document processor 110 stops recursively splitting the input document 114 (e.g., upon expiration of the time threshold or upon reaching a word level split), the significance scores 122 finally assigned to the words of the input document 114 may be referred to as an influence map 124, wherein the significance score 122 of each word is indicative of a degree of influence the word has in predicting that the input document 114 is of the selected document type 118. The document processor 110 may locally store the influence map 124 having the final significance scores 122 of each word of the input document 114.

The document processor 110 may be configured to assign a level of visual emphasis to be placed on each word of the input document 114 based on how much influence the word exercised on the input document 114 being assigned a particular document type 118, wherein the influence of the word is a direct function of the significance score 122 of the word. For example, a level of visual emphasis assigned to a word of the input document 114 is directly proportional to the significance score 122 of the word, wherein a higher level of visual emphasis is assigned to a word having a higher significance score 122. In other words, a higher level of visual emphasis is assigned to a word determined to have a higher influence over the classification. A word may be visually emphasized in a number of ways. In one embodiment, visually emphasizing a word may include highlighting a word in a predetermined color. In this case, an opacity of highlighting a word may be decided based on the significance score 122 of the word, wherein a higher level of opacity of the highlighting (e.g., darker highlighting) is assigned to a word having a higher significance score 122. Accordingly, words having a higher significance score 122 are highlighted in a darker shade as compared to words having a lower significance score 122. For example, the significance scores 122 or weights may range from 0-100, wherein each significance score corresponds to a slightly different opacity of highlighting with a significance score of 0 corresponding to the lowest opacity of highlighting (lightest highlighting, for example, no highlighting) and a significance score of 100 corresponding to the highest opacity of highlighting (darkest highlighting).

At operation 324, the document processor 110 displays the input document on a display device with each word of the input document visually emphasized in accordance with the determined level of visual emphasis of the word from the influence map 124. As described above, the document processor 110 may be configured to display the input document 114 on the display device (e.g., display of a user device 140 being operated by the user 150) with each word of the input document 114 visually emphasized (e.g., highlighted) in accordance with the determined level of visual emphasis of the word. For example, when the visual emphasis includes highlighting words in a particular color, this results in portions of the input document 114 (e.g., words, sentences etc.) being shown highlighted in different shades of the color, wherein high influence words (e.g., having higher significance score 122) are shown highlighted in a darker shade.

Figure 4:
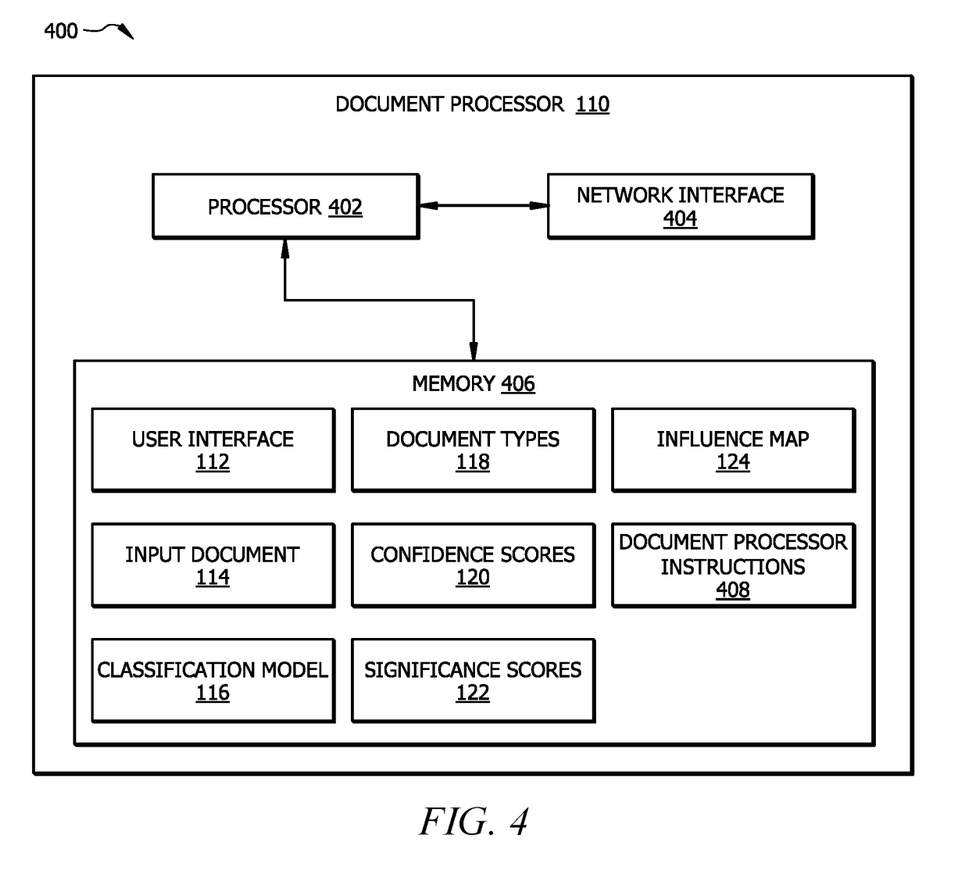
FIG. 4 illustrates an example schematic diagram of the document processor illustrated in FIG. 1, in accordance with one or more embodiments of the present disclosure.

FIG. 4 illustrates an example schematic diagram 400 of the document processor 110 illustrated in FIG. 1, in accordance with one or more embodiments of the present disclosure.

Document processor 110 includes a processor 402, a memory 406, and a network interface 404. The document processor 110 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., document processor instructions 408) to implement the document processor 110. In this way, processor 402 may be a special-purpose computer designed to implement the functions disclosed herein. In one or more embodiments, the document processor 110 is implemented using logic units, FPGAs, ASICs, DSPs, or any other suitable hardware. The document processor 110 is configured to operate as described with reference to FIGS. 1-3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store UI 112, input document 114, classification model 116, information relating to document types 118, confidence scores 120, significance scores 122, influence map 124 and the document processor instructions 408. The document processor instructions 408 may include any suitable set of instructions, logic, rules, or code operable to execute the document processor 110.

The network interface 404 is configured to enable wired and/or wireless communications. The network interface 404 is configured to communicate data between the document processor 110 and other devices, systems, or domains (e.g. user devices 140 and/or database 160). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the user devices 140 and database 160 may be implemented similar to the document processor 110. For example, each user device 140 and database 160 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
 a display device that displays an input document in a user interface;
 at least one processor configured to:
  receive a command to determine a type of the input document;
  in response to receiving the command, classify the input document using a classification model, wherein the classification model is pre-trained to identify a plurality of types of documents, wherein the classification model predicts that the input document is of at least one type of the plurality of types along with a corresponding confidence score, wherein the confidence score is indicative of a probability of the input document being of the at least one type;
  assign a significance score to each word of the input document, wherein the significance score of a word in the input document is indicative of a degree of influence the word has in deciding that the input document is of the at least one type, wherein assigning the significance score to each word of the input document comprises:
   recursively splitting the input document into a plurality of parts;

classifying each part of the plurality of parts using the classification model to determine the confidence score of the part, wherein the confidence score of the part is indicative of a probability of the part being of the at least one type; and
    assigning a significance score to each word of each part based on the confidence score of the part;
  determine a level of visual emphasis to be placed on each word of the input document based on the significance score of the word, wherein a word having a higher significance score is assigned a higher level of visual emphasis; and
  display the input document on the display device with each word of the input document visually emphasized in accordance with the determined level of visual emphasis of the word.

2. The apparatus of claim 1, wherein the at least one processor assigns the significance score to each word of the input document by:
  initializing the significance score of all words of the input document to zero, wherein each significance score includes a numerical weight;
  dividing the input document into two parts;
  in a first iteration:
    classifying each of the two parts using the classification model to determine the confidence score of the part, wherein the confidence score of each part comprises a numeral percentage indicating a probability of the part being of the at least one type;
    subtracting the confidence score of the part having a lower numerical percentage from the confidence score of the part having a higher numerical percentage;
    dividing the difference of the confidence scores by two to yield an adjustment factor;
    adding the adjustment factor to the weights of each word of the part having the higher numerical percentage; and
    subtracting the adjustment factor from the weights of each word of the part having the lower numerical percentage;
  in a second iteration:
    dividing each part of the input document into two further parts; and
    for each part of the input document:
      setting the two further parts as the two parts; and
      repeating the first iteration; and
  repeating the second iteration until a pre-determined threshold is reached.

3. The apparatus of claim 2, wherein the pre-determined threshold comprises a pre-determined time interval from receiving the command, wherein the second iteration is repeated until the time interval expires.

4. The apparatus of claim 1, wherein the at least one processor is further configured to:
  classify the input document into a plurality of document types including the at least one document type;
  determine a confidence score corresponding to each document type, wherein the confidence score of corresponding to each document type is indicative of a probability of the input document being of the document type; and
  display each of the plurality of document types and the corresponding confidence score on the display device.

5. The apparatus of claim 4, wherein each confidence score comprises a numerical percentage of the probability.

6. The apparatus of claim 4, wherein the at least one processor is further configured to:
  receive a selection of one of the classified document types; and
  assign the significance score to each word of the input document corresponding to the selected document type, wherein the assigned significance score of each word is indicative of a degree of influence the word has in deciding that the input document is of the selected document type.

7. The apparatus of claim 1, wherein the at least one processor is configured to:
  visually emphasize one or more words of the document by highlighting the document in a pre-determined color, wherein:
    for each visually emphasized word, an opacity of the highlighting corresponds to the determined level of visual emphasis for the word; and
    a higher opacity of the highlighting is assigned to a higher determined level of visual emphasis.

8. The apparatus of claim 1, wherein the significance score of a word comprises a numerical weight assigned to the word.

9. A method for classification of an input document, comprising:
  receiving a command to determine a type of the input document;
  in response to receiving the command, classifying the input document using a classification model, wherein the classification model is pre-trained to identify a plurality of types of documents, wherein the classification model predicts that the input document is of at least one type of the plurality of types along with a corresponding confidence score, wherein the confidence score is indicative of a probability of the input document being of the at least one type;
  assigning a significance score to each word of the input document, wherein the significance score of a word in the input document is indicative of a degree of influence the word has in deciding that the input document is of the at least one type, wherein assigning the significance score to each word of the input document comprises:
    recursively splitting the input document into a plurality of parts;
    classifying each part of the plurality of parts using the classification model to determine the confidence score of the part, wherein the confidence score of the part is indicative of a probability of the part being of the at least one type; and
    assigning a significance score to each word of each part based on the confidence score of the part;
  determining a level of visual emphasis to be placed on each word of the input document based on the significance score of the word, wherein a word having a higher significance score is assigned a higher level of visual emphasis; and
  displaying the input document on a display device with each word of the input document visually emphasized in accordance with the determined level of visual emphasis of the word.

10. The method of claim 9, wherein assigning the significance score to each word of the input document comprises:
  initializing the significance score of all words of the input document to zero, wherein each significance score includes a numerical weight;
  dividing the input document into two parts;

in a first iteration:
classifying each of the two parts using the classification model to determine the confidence score of the part, wherein the confidence score of each part comprises a numeral percentage indicating a probability of the part being of the at least one type;
subtracting the confidence score of the part having a lower numerical percentage from the confidence score of the part having a higher numerical percentage;
dividing the difference in the confidence scores by two to yield an adjustment factor;
adding the adjustment factor to the weights of each word of the part having the higher numerical percentage; and
subtracting the adjustment factor from the weights of each word of the part having the lower numerical percentage;
in a second iteration:
dividing each part of the input document into two further parts; and
for each part of the input document:
setting the two further parts as the two parts; and repeating the first iteration; and
repeating the second iteration until a pre-determined threshold is reached.

11. The method of claim 10, wherein the pre-determined threshold comprises a pre-determined time interval from receiving the command, wherein the second iteration is repeated until the time interval expires.

12. The method of claim 9, further comprising:
classifying the input document into a plurality of document types including the at least one document type;
determining a confidence score corresponding to each document type, wherein the confidence score of corresponding to each document type is indicative of a probability of the input document being of the document type; and
displaying each of the plurality of document types and the corresponding confidence score on the display device.

13. The method of claim 12, wherein each confidence score comprises a numerical percentage of the probability.

14. The method of claim 12, wherein further comprising:
receiving a selection of one of the classified document types; and
assigning the significance score to each word of the input document corresponding to the selected document type, wherein the assigned significance score of each word is indicative of a degree of influence the word has in deciding that the input document is of the selected document type.

15. The method of claim 9, wherein:
visually emphasizing one or more words of the document comprises highlighting the document in a pre-determined color;
for each visually emphasized word, an opacity of the highlighting corresponds to the determined level of visual emphasis for the word; and
a higher opacity of the highlighting is assigned to a higher determined level of visual emphasis.

16. The method of claim 9, wherein the significance score of a word comprises a numerical weight assigned to the word.

17. A computer-readable medium for classification of an input document, wherein the computer-readable medium stores instructions which when processed by a processor perform a method comprising:
receiving a command to determine a type of the input document;
in response to receiving the command, classifying the input document using a classification model, wherein the classification model is pre-trained to identify a plurality of types of documents, wherein the classification model predicts that the input document is of at least one type of the plurality of types along with a corresponding confidence score, wherein the confidence score is indicative of a probability of the input document being of the at least one type;
assigning a significance score to each word of the input document, wherein the significance score of a word in the input document is indicative of a degree of influence the word has in deciding that the input document is of the at least one type, wherein assigning the significance score to each word of the input document comprises:
recursively splitting the input document into a plurality of parts;
classifying each part of the plurality of parts using the classification model to determine the confidence score of the part, wherein the confidence score of the part is indicative of a probability of the part being of the at least one type; and
assigning a significance score to each word of each part based on the confidence score of the part;
determining a level of visual emphasis to be placed on each word of the input document based on the significance score of the word, wherein a word having a higher significance score is assigned a higher level of visual emphasis; and
displaying the input document on a display device with each word of the input document visually emphasized in accordance with the determined level of visual emphasis of the word.

18. The computer-readable medium of claim 17, wherein assigning the significance score to each word of the input document comprises:
initializing the significance score of all words of the input document to zero, wherein each significance score includes a numerical weight;
dividing the input document into two parts;
in a first iteration:
classifying each of the two parts using the classification model to determine the confidence score of the part, wherein the confidence score of each part comprises a numeral percentage indicating a probability of the part being of the at least one type;
subtracting the confidence score of the part having a lower numerical percentage from the confidence score of the part having a higher numerical percentage;
dividing the difference of the confidence scores by two to yield an adjustment factor;
adding the adjustment factor to the weights of each word of the part having the higher numerical percentage; and
subtracting the adjustment factor from the weights of each word of the part having the lower numerical percentage;
in a second iteration:
dividing each part of the input document into two further parts; and
for each part of the input document:
setting the two further parts as the two parts; and repeating the first iteration; and repeating the second iteration until a pre-determined threshold is reached.

19. The computer-readable medium of claim 18, wherein the pre-determined threshold comprises a pre-determined time interval from receiving the command, wherein the second iteration is repeated until the time interval expires.

20. The computer-readable medium of claim 17, wherein:
- visually emphasizing one or more words of the document comprises highlighting the document in a pre-determined color;
- for each visually emphasized word, an opacity of the highlighting corresponds to the determined level of visual emphasis for the word; and
- a higher opacity of the highlighting is assigned to a higher determined level of visual emphasis.

* * * * *